United States Patent [19]

Morita

[11] 4,293,289
[45] Oct. 6, 1981

[54] LUBRICATING MEANS FOR ROTARY PISTON ENGINES WITH PRESSURE AND TEMPERATURE RESPONSIVE VALVE MEANS IN THE ECCENTRIC SHAFT

[75] Inventor: Yasuyuki Morita, Hiroshima, Japan
[73] Assignee: Toyo Kogyo Co., Ltd., Hiroshima, Japan
[21] Appl. No.: 45,693
[22] Filed: Jun. 5, 1979
[30] Foreign Application Priority Data Jun. 7, 1978 [JP] Japan .................... 53-69186

[51] Int. Cl.$^3$ ................ F01C 21/04; F01C 21/06; F16K 17/04; F16K 17/38
[52] U.S. Cl. ........................... 418/84; 418/87; 418/88; 418/94; 137/468
[58] Field of Search .............. 418/84, 87, 88, 94; 123/196 R, 196 S; 184/6.3, 6.4; 137/468; 236/92 R

[56] References Cited

U.S. PATENT DOCUMENTS

| | | | |
|---|---|---|---|
| 1,616,913 | 2/1927 | McCallum | 418/87 |
| 2,371,122 | 3/1945 | Armstrong | 137/468 |
| 2,842,155 | 7/1958 | Peters | 137/468 |
| 3,082,937 | 3/1963 | Tucker | 418/94 |
| 3,359,952 | 12/1967 | Jones et al. | 418/88 |

FOREIGN PATENT DOCUMENTS 844370 7/1952 Fed. Rep. of Germany ....... 184/6.4

OTHER PUBLICATIONS

Yamamoto, K., *Rotary Engine,* Toyo Kogyo Co., Ltd., Japan, 1971, pp. 70–76.

*Primary Examiner*—John J. Vrablik
*Attorney, Agent, or Firm*—Fleit & Jacobson

[57] ABSTRACT

A rotary piston engine including a lubricating system having an oil passage extending axially through an eccentric shaft for supplying lubricating oil from an oil pump to bearing portions. A pressure regulator valve is provided in said oil passage in the eccentric shaft so that the oil pressure as regulated by the regulator valve is not affected by the centrifugal force which may be produced in the oil passing through a radial passage between the oil pump and the oil passage in the eccentric shaft. The regulator valve may include a temperature sensor which is responsive to the surrounding temperature.

5 Claims, 4 Drawing Figures

LUBRICATING MEANS FOR ROTARY PISTON ENGINES WITH PRESSURE AND TEMPERATURE RESPONSIVE VALVE MEANS IN THE ECCENTRIC SHAFT

The present invention relates to rotary piston engines and more particularly to lubricating means for rotary piston engines.

Conventional rotary piston engines comprise a casing which includes a rotor housing having an inner wall of trochoidal configuration and a pair of side housings secured to the opposite sides of the rotor housing to define a rotor cavity of a trochoidal configuration, and a substantially polygonal rotor disposed in said rotor cavity and carried by an eccentric shaft for rotation with apex portions in sliding contact with the inner wall of the rotor housing. The engine includes a lubricating system comprised of an oil passage formed axially in said eccentric shaft for providing a supply of lubricant oil to various bearing portions such as main and rotor bearings. A typical example of such lubricating system is shown in the U.S. Pat. No. 3,359,952 issued to C. Jones et al on Dec. 26, 1967. Usually, the lubricant oil is fed from an oil reservoir by means of an oil pump to the oil passage in the eccentric shaft through a pressure regulator under a predetermined pressure so that the oil is forced to pass to the bearing portions and then returned to the oil reservoir. A typical example of such lubricating system is shown and described in pages 70 through 76 of a book entitled "Rotary Engine" written by K. Yamamoto and published by the assignee of the invention in October 1971 so that reference may be made to this literature.

In the known lubricating system for rotary piston engines, there unavoidably exists a certain amount of pressure drop in the oil pressure. Further, since the lubricant oil is passed from the pressure regulator radially inwardly to the oil passage in the eccentric shaft through a radial passage which is also formed in the eccentric shaft, there is a further pressure drop in the radial passage due to a centrifugal force in the lubricant oil. The pressure drop due to the centrifugal force increases as the engine speed increases so that the pressure in the oil passage becomes lower under a high engine speed than under a low or medium engine speed. It should therefore be understood that in the conventional lubricating system the pump outlet pressure and the regulator outlet pressure must be maintained at a relatively high value so that an adequate oil pressure is ensured at the portions which are to be lubricated. Consequently, an increased amount of load has been imposed upon the engine for driving the oil pump.

As a further problem of the conventional rotary piston engine lubricating system, it should be pointed out that the lubricant oil is utilized also for cooling the rotor of the engine. Where the regulator outlet pressure is maintained at a relatively high value as described above, an excessive amount of oil will be splashed to the rotor under a low speed engine operation so that the engine rotor will be excessively cooled. This will cause a delay in engine warming-up and consequent increase in pollutant emissions in the engine starting period.

It is therefore an object of the present invention to provide a lubricating system for rotary piston engines in which pump outlet pressure can be maintained relative low while providing an adequate oil pressure at portions where lubrications are required.

Another object of the present invention is to provide a lubricating system for rotary piston engines, in which lubricant oil is utilized also for cooling the engine rotor and the oil pressure can be maintained as low as possible so as to avoid excessive cooling of the rotor even under a light load engine operation.

A further object of the present invention is to provide a rotary piston engine lubricating system which is effective to eliminate excessive load on the oil pump and makes it posible to accomplish engine warming-up more quickly than in conventional rotary piston engines.

According to the present invention, the above and other objects can be accomplished by a rotary piston engine comprising a casing which includes a rotor housing having an inner wall of trochoidal configuration and a pair of side housings secured to the opposite sides of the rotor housing to define a rotor cavity of a trochiodal configuration, and a substantially polygonal rotor disposed in said rotor cavity and carried by an eccentric shaft for rotation with apex portions in sliding contact with the inner wall of the rotor housing, a lubricating system including oil passage means extending substantially axially in said eccentric shaft, oil pump means for supplying lubricant oil under pressure to said oil passage means, and pressure regulating valve means provided in said oil passage means in the eccentric shaft means for determining oil pressure in the oil passage means.

According to the feature of the present invention, since the pressure regulating valve means is provided in the oil passage means in the eccentric shaft, the oil pressure in the oil passage means is not affected by the pressure drop due to the centrifugal force produced in the oil in the radial passage means between the oil pump means and the oil passage means in the eccentric shaft means. Thus, it is possible to maintain the oil pressure substantially constant throughout the engine operation irrespective of the engine speed. Consequently, under low engine speed, the oil pressure can be lower than that in conventional engines in which the oil pressure gradually decreases in response to an increase in the engine speed due to the centrifugal effect so that the oil pressure must be maintained at a high value under low engine speed in order to ensure an adequate pressure under high engine speed. It should therefore be understood that the load on the oil pump means can be decreased. Further, it is possible to avoid excessive cooling of the rotor and under a low speed engine operation so that the engine can quickly be warmed-up.

According to a preferable aspect of the present invention, the pressure regulating valve means is located at one end portion of the eccentric shaft and includes valve member means axially slidable in valve bore means extending axially in said eccentric shaft, said valve bore means being in communication with the oil passage means at an axial end thereof through shoulder means, said valve member means having surface means adapted to seat on said shoulder means to block the communication between the oil passage means and the valve bore means, resilient means for biasing the valve member means toward said shoulder means, said valve bore means being formed with pressure relief port means which is adapted to be brought into communication with the oil passage means when the valve member means is axially moved against the resilient means under pressure in said oil passage means.

According to a further aspect of the present invention, the pressure regulating valve means is of a temperature responsive type so that the oil pressure in the oil passage means is increased in accordance with an increase in oil temperature. For example, the valve member means in the above described valve structure may be comprised of a temperature responsive element which expands in accordance with an increase in the oil temperature.

According to a further aspect of the present invention, the pressure regulating valve means is of a rotating speed responsive type so that the oil pressure in the oil passage means is increased in response to an increase in the engine speed. Specifically, the valve means may include a valve chamber having a valve seat located at radially outward end portion of the valve chamber for providing a communication between the oil passage means and the valve chamber, a centrifugal valve member disposed in said valve chamber and normally biased by resilient means toward the valve seat whereby the valve member is forced into engagement with the valve chamber against the oil pressure in the oil passage means under centrifugal force and the resilient means.

The above and other objects and features of the present invention will become apparent from the following descriptions of preferred embodiments taking reference to the accompanying drawings, in which.

Figure 1:
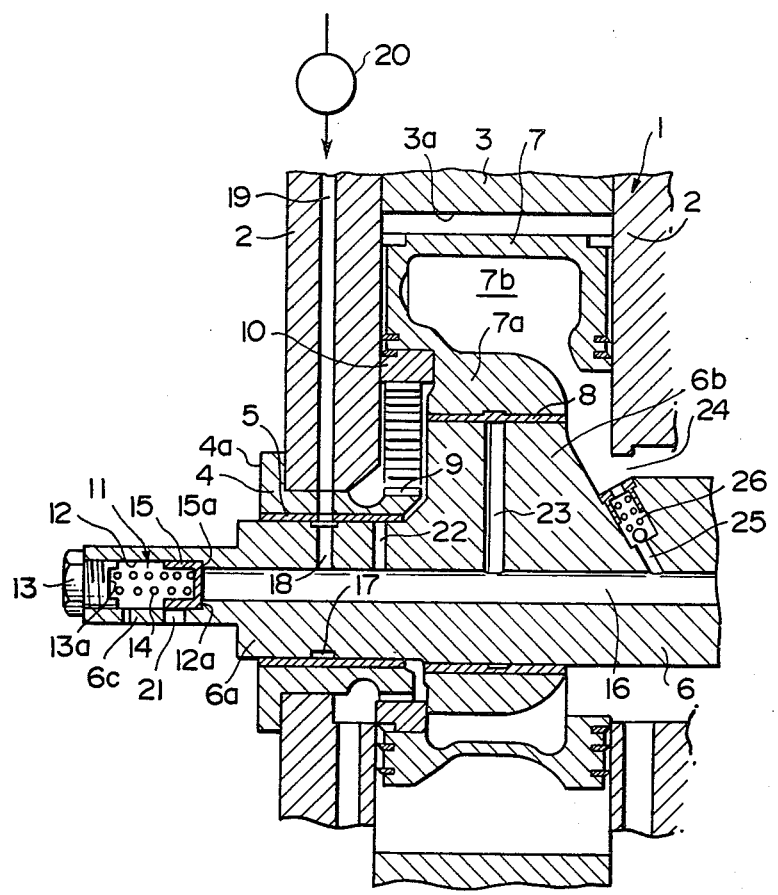
FIG. 1 is a fragmentary sectional view of a rotary piston engine in accordance with one embodiment of the present invention.

Referring now to the drawings, particularly to FIG. 1, the rotary piston engine shown therein includes a casing 1 which is comprised of a pair of side housings 2 and a rotor housing 3 disposed between the side housings 2. The rotor housing 3 has a trochoidal inner wall 3a to define a rotor cavity of a trochoidal configuration in the casing 1. One of the side housings 2 carries a bearing support 4 which has a flange 4a secured to the side housing 2. A main bearing 5 is mounted on the bearing support 4 at the inner periphery thereof. An eccentric shaft 6 is supported for rotation by the main bearing 5 at one end portion 6a. Although not shown in the drawing, the shaft 6 is also supported at the other end portion by means of a similar bearing.

The eccentric shaft 6 has an eccentric section 6b which carries a rotor 7 through a rotor bearing 8. The rotor 7 is of a substantially triangular configuration and disposed in the trochoidal rotor cavity in the casing 1 with apex portions in sliding contact with the inner wall 3a of the rotor housing 3. The rotor 7 has a central boss portion 7a which is rotatably engaged with the rotor bearing 8. Further, the rotor 7 is formed with inside cavities one of which is shown in FIG. 1 by a reference character 7b. The bearing support 4 is formed with an external gear 9 coaxial with the end portion 6a of the shaft 6. The gear 9 is in engagement with an internal gear 10 which is coaxial with the eccentric portion 6b of the shaft 6 and secured to the rotor 7.

The rotary piston engine shown in FIG. 1 includes a lubricating system which comprises an oil passage 16 extending axially in the eccentric shaft 6. The shaft 6 is formed at the outer surface of the end portion 6a with an annular groove 17 which is connected with the oil passage 16 through a radial passage 18 formed in the shaft 6. An oil supply passage 19 is formed through the side housing 2 and the bearing support 4 to transmit lubricant oil under pressure from an oil pump 20 to the annular groove 17.

The eccentric shaft 6 is further formed with radial passages 22 and 23 which are adapted to pass lubricant oil respectively to the bearings 5 and 8. There is further formed in the eccentric shaft 6 a cooling oil passage 25 which is provided with a speed responsive oil jet 26 for splashing lubricant oil toward the cavity 7b under an engine speed greater than a predetermined value so that the rotor 7 is cooled by the lubricant oil. An oil return passage 24 is formed between the side housing 2 and the eccentric shaft 6 so that the oil in the cavity 7b is returned to the oil sump.

In the embodiment shown in FIG. 1, a pressure regulating valve 11 is provided at one end of the eccentric shaft 6. The valve 11 includes a valve bore 12 formed in an extension 6c of the shaft 6 to extend axially and having one end in communication with the oil passage 16 through a shoulder 12a. The other end of the valve bore is closed by a plug 13 which has a spring seat 13a. A valve member 15 is disposed in the valve bore 12 for slidable movement therein and has a surface 15a adapted to engage with the shoulder 12a to block the communication between the valve bore 12 and the oil passage 16. A spring 14 is provided between the spring seat 13a and the valve member 15 to bias the valve member 15 toward the shoulder 12a. The valve bore 12 is provided with a relief port 21 which is so located that the oil passage 16 is opened to the relief port 21 when the valve member 15 is moved under the oil pressure in the passage 16. The relief pressure of the regulating valve 11 is determined by the strength of the spring 14 which can be adjusted by the plug 13.

In the embodiment described above, the pressure regulating valve 11 is located at one end of the eccentric shaft 6 so that the oil pressure in the passage 16 is free from the centrifugal effect but can directly be adjusted to a substantially constant value throughout the engine operating range. It is therefore possible to keep the oil pressure to a low value as compared with that in the conventional rotary piston engines. Consequently, it is possible to decrease the load on the oil pump 20.

Figure 2:
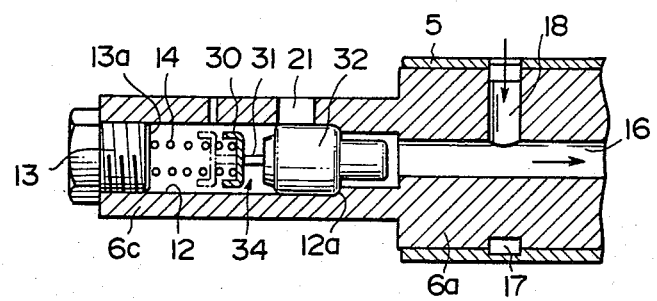
FIG. 2 is a fragmentary sectional view specifically showing a pressure regulating valve in accordance with another embodiment of the present invention.

Referring now to FIG. 2, there is shown a modification of the pressure regulating valve. In this embodiment, the regulating valve 34 includes a valve member which is comprised of a temperature responsive element 32 having an axially extensible rod 31 which has a free end provided with a spring seat 30. The length of projection of the rod 31 increases in response to an increase in the oil temperature as shown by phantom lines in FIG. 2 so that the spring load is consequently increased. Thus, in the illustrated arrangement, the relief pressure of the valve 34 increases as the oil temperature increases.

Figure 3:
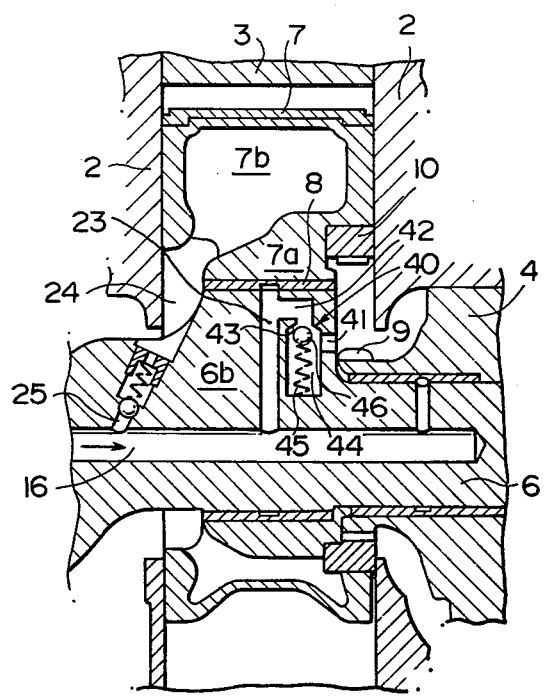
FIG. 3 is a fragmentary sectional view of a rotary piston engine in accordance with a further embodiment of the present invention.

Referring to FIG. 3 which shows a further embodiment of the present invention, the rotary piston engine shown therein includes a pressure regulating valve 40 provided in the eccentric section 6b of the shaft 6. The pressure regulating valve 40 includes a valve chamber 44 which extends in radial direction of the shaft 6 and has an outward end connected through a passage 42 with the radial passage 23 extending between the oil passage 16 and the rotor bearing 8. The valve chamber 44 is formed with a relief port 41 and has a valve seat 43 formed at the junction between the passage 42 and the valve chamber 44. A valve member 46 which is in the form of a ball is disposed in the valve chamber 44 for cooperation with the valve seat 43 and a spring is provided so as to urge the valve member 46 toward the valve seat 43.

In this arrangement, the valve member 46 is forced into engagement with the valve seat 43 under the action of the spring 45 and also under the centrifugal force in the valve member 46 itself. It should therefore be noted that the relief pressure of the regulating valve 40 is increased in response to an increase in the engine speed. Consequently, it is possible to increase the oil pressure in the passage 16 in accordance with an increase in the engine speed.

Figure 4:
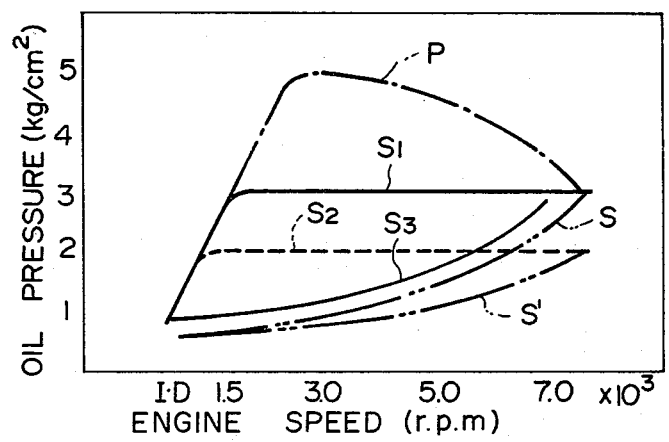
FIG. 4 is a diagram showing the relationship between the oil pressure and the engine speed.

Referring to FIG. 4, the curve S shows a demand for lubricating oil in a normal rotary piston engine. As shown, the required oil pressure gradually increases as the engine speed increases. Further, the required oil pressure is lower under a low oil temperature than under a high oil temperature as shown by a curve S'. The highest required oil pressure with a high oil temperature such as 80° C. under the highest engine speed is approximately 3 Kg/cm$^2$. In the arrangement shown in FIG. 1, the regulating valve 11 is therefore adjusted so that the relief pressure thereof becomes slightly higher than the highest required oil pressure under the high oil temperature as shown by a curve $S_1$ in FIG. 4.

In the arrangement shown in FIG. 2, the relief pressure of the regulating valve 34 may be as shown by the curve $S_1$ under a high oil temperature, for example, 80° C. and as shown by a curve $S_2$ under a low oil temperature, for example, 40° C. In the arrangement shown in FIG. 3, the relief pressure of the regulating valve 40 can be changed in accordance with the engine speed as shown by a curve $S_3$.

In conventional lubricating system for a rotary piston engine, however, the oil pressure in the oil passage decreases in response to an increase in the engine speed as shown by a curve P in FIG. 4 due to the centrifugal effect. Therefore, the relief pressure of the pressure regulating valve must be substantially higher than the required oil pressure under a high engine speed. It will therefore be understood that, in accordance with the present invention, it is possible to maintain the oil pressure in the eccentric shaft passage much lower than that in the conventional lubricating system so that it is possible to decrease the load on the oil pump 20. Further, since the supply of oil is small as compared with that in the conventional lubricating system, it is possible to avoid excessive cooling of rotor under a low speed engine operation so that the engine warming-up period can be shortened. Pollutant emissions in the exhaust gas can therefore be decreased and the fuel economy can be improved.

The invention has thus been shown and described with reference to specific embodiments, however, it should be noted that the invention is in no way limited to the details of the illustrated structures but changes and modifications may be made without departing from the scope of the appended claims.

I claim:

1. Rotary piston engine comprising a casing which includes a rotor housing having an inner wall of trochoidal configuration and a pair of side housings secured to the opposite sides of the rotor housing to define a rotor cavity of a trochoidal configuration, and a substantially polygonal rotor disposed in said rotor cavity and carried by an eccentric shaft for rotation with apex portions in sliding contact with the inner wall of the rotor housing, a lubricating system including oil passage means extending substantially axially in said eccentric shaft, oil pump means for supplying lubricant oil under pressure to said oil passage means, and pressure regulating valve means provided in said oil passage means in the eccentric shaft means for determining oil pressure in the oil passage means, said rotor having interior cooling cavity means, oil supply passage means branched from said oil passage means in said eccentric shaft for supplying rotor cooling oil to said cooling cavity means, said pressure regulating valve means including temperature responsive means provided in said eccentric shaft for controlling the oil pressure in accordance with a surrounding temperature so that the oil pressure in said eccentric shaft is decreased in response to a decrease in said surrounding temperature to thereby decrease the rotor cooling oil supplied to said cooling cavity.

2. Rotary piston engine in accordance with claim 1, in which said pressure regulating valve means is located at one axial end portion of the eccentric shaft.

3. Rotary piston engine in accordance with claim 1, in which said pressure regulating valve means includes valve member means in valve bore means extending axially in said eccentric shaft, said valve bore means being in communication with the oil passage means at an axial end thereof through shoulder means, said valve member means having surface means adapted to seat on said shoulder means to block the communication between the oil passage means and the valve bore means, resilient means for biasing the valve member means towards said shoulder means, said valve bore means being formed with pressure relief port means adapted to be brought into communication with the oil passage means when the valve member means is axially moved against the resilient means under pressure in said oil passage means, temperature responsive means responsive to a surrounding temperature and associated with said resilient means so that said resilient means provides a biasing force towards said shoulder means which decreases as the surrounding temperature decreases.

4. Rotary piston engine comprising a casing which includes a rotor housing having an inner wall of trochoidal configuration and a pair of side housings secured to the opposite sides of the rotor housing to define a rotor cavity of a trochoidal configuration, and a substantially polygonal rotor disposed in said rotor cavity and carried by an eccentric shaft for rotation with apex portions in sliding contact with the inner wall of the rotor housing, a lubricating system including oil passage means extending substantially axially in said eccentric shaft, oil pump means for supplying lubricant oil under pressure to said oil passage means, and pressure regulating valve means provided in said oil passage means in the eccentric shaft means for determining oil pressure in the oil passage means, said pressure regulating valve means including valve member means in valve bore means extending axially in said eccentric shaft, said valve bore means being in communication with the oil passage means at an axial end thereof through shoulder means, said valve member means having surface means adapted to seat on said shoulder means to block the communication between the oil passage means and the valve bore means, resilient means for biasing the valve member means towards said shoulder means, said valve bore means being formed with pressure relief port means adapted to be brought into communication with the oil passage means when the valve member means is axially moved against the resilient means under pressure in said oil passage means, temperature responsive means responsive to a surrounding temperature and associated with said resilient means so that said resilient means provides a biasing force towards said shoulder means that decreases as the surrounding temperature decreases.

5. Rotary piston engine in accordance with claim 4, in which said temperature responsive means is located in said valve bore means for movement therein substantially axially with respect to said eccentric shaft.

* * * * *